United States Patent [19]
Dodson et al.

[11] 3,781,067
[45] Dec. 25, 1973

[54] BELT TRACK STRUCTURE

[75] Inventors: Merritt E. Dodson; Richard L. Marsh, both of Lincoln; Frank C. Masters, Palmyra, all of Nebr.

[73] Assignee: The Goodyear Tire & Rubber Company, Akron, Ohio

[22] Filed: Sept. 21, 1972

[21] Appl. No.: 290,935

[52] U.S. Cl............................ 305/35 EB, 260/94.2
[51] Int. Cl............................................ B62d 55/24
[58] Field of Search........................ 305/35 EB, 38; 260/94.2, 94.3, 94.7

[56] References Cited
UNITED STATES PATENTS

| | | | |
|---|---|---|---|
| 3,170,907 | 2/1965 | Ueda | 260/94.3 |
| 3,178,402 | 4/1965 | Smith | 260/94.2 R |
| 3,281,404 | 10/1966 | Natta | 260/94.7 R |
| 3,722,961 | 3/1973 | Haley | 305/38 |
| 3,680,925 | 8/1972 | Spivy | 305/38 |
| 3,711,165 | 1/1973 | Russ | 305/35 EB |
| 3,480,339 | 11/1969 | Kell | 305/35 EB |
| 3,738,714 | 6/1973 | Ness | 180/5 R |

Primary Examiner—Richard J. Johnson
Attorney—F. W. Brunner et al.

[57] ABSTRACT

A belt track for a track-driven vehicle and a method of making the belt track. The belt track has an inner surface adapted for moving contact with rigid elements of the vehicle drive apparatus and the belt track supporting system. The inner surface of the belt track includes at least one surface portion comprised of a vulcanized rubbery composition of a polybutadiene polymer. Other different rubbery polymers such as styrene/butadiene or nitrile rubber may also be used in combination with the polybutadiene polymer. The surface portions provide a low friction, wear resistant surface which is resistant to temperature extremes. The belt track is particularly useful in conjunction with vehicle slider suspension systems and with driving systems in which a driving sprocket comes into moving contact with driving teeth or lugs formed on the inner surface of the belt track.

20 Claims, 8 Drawing Figures

PATENTED DEC 25 1973
3,781,067
SHEET 2 OF 2

BELT TRACK STRUCTURE

BACKGROUND OF THE INVENTION

This invention relates to a flexible endless belt track for a track-driven vehicle such as a snowmobile or the like and to a method of making such belt tracks. The invention more particularly relates to such a belt track having an improved inner surface construction adapted for contact with the vehicle driving apparatus and/or belt track supporting system. The invention even more particularly relates to belt tracks having improved flexible, low friction and wear resistant surfaces for use with vehicle slider suspension systems and with driving systems in which a driving sprocket comes into moving contact with driving teeth or lugs formed on the inside surface of the belt track.

It has been quite common in the prior art to produce belt tracks for small track-driven vehicles such as snowmobiles in which the tracks are provided with one or two rows of spaced sprocket teeth receiving openings adapted to mesh with the vehicle drive sprockets. More recently, it has been popular to mold the driving teeth or lugs on the inside surface of the belt track which operate in conjunction with specially designed sprockets to drive the vehicle with no sprocket teeth-receiving openings being necessary. An example of the latter type construction is disclosed in Irgens U.S. Pat. No. 3,472,563. Some tracks utilize a combination of the driving lugs and sprocket teeth-receiving openings as is illustrated in Russ, Sr US Pat. No. 3,575,474. Those skilled in the art are aware that in belt track constructions of the type discussed above, the direct sliding frictional contact between the sprocket and the inner surface of the track results in an excessive amount of wear often necessitating the early replacement of the track.

Various belt track or tread supporting systems have also been used in small track-driven vehicles. Most of these systems employ a series of wheels referred to as bogies, positioned along the lateral edges of the track for a portion of the length of the inner surface to support ground-contacting portion of the track. An example of a snowmobile track supporting or suspension system in which bogies are used is shown in Marier US Pat. No. 3,309,150. In another type belt suspension system for a snowmobile as disclosed in Swenson et al, US Pat. No. 3,485,312, slider elements rather than bogies are employed. In slider suspension systems a slider bar is in direct sliding frictional contact with at least a portion of the inner surface of the belt track. It is common, for example, in this type system for the belt track to be provided with steel cross bars having their under surfaces exposed for sliding contact with longitudinally extending channel members that have been fitted to a rigid steel frame such that the bars are in alignment with the sprocket teeth-receiving openings created in the rubber track between the exposed under surfaces of the steel cross bars. The channel members are composed of a low friction material such as high density polyethylene. One problem which has been encountered with the use of the channel member or slider bar is its tendency to wear rapidly at the relatively low temperatures, for example 150°–200° F. These temperatures are built up by frictional contact during the operation of the vehicle in which no snow or water is available for lubrication. Attempts to find other suitable low friction wear-resistant materials from which to produce the slider bars have not proven to be entirely satisfactory.

When the slider members of a belt track supporting system are run in contact with the inner surface of the belt track at least for relatively short periods of time without lubrication, excessively high temperatures result from the frictional heat buildup. Sometimes these temperatures may reach as high as 550° or 600° F at the inner face between the belt track and the slider members. Consequently, the material of the inner surface of the belt track must not only withstand extremely low temperatures, perhaps as low as −50° F when used in travel over snow and ice but must also be capable of withstanding extremely high temperatures as well.

It has been discovered that the beforementioned problems are overcome by the use of the improved belt track of the present invention as will be hereinafter described.

OBJECTS OF THE INVENTION

It is an object of the present invention to provide a belt track for a track-driven vehicle and a method of making such a belt track wherein the belt track has an inner surface capable of withstanding direct sliding frictional contact with rigid elements of the vehicle driving system and the track suspension system under a wide variety of conditions.

It is another object of the present invention to provide a belt track construction having an improved flexible, low friction and wear resistant inner surface which will withstand both high and low temperature extremes.

It is still another object of the present invention to provide in a track-driven vehicle an improved belt for use with slider suspension systems.

Other objects and advantages of this invention will become apparent hereinafter as the description thereof proceeds, the novel features, arrangements and combinations being clearly pointed out in the specification as well as the claims thereunto appended.

In accordance with the present invention, it has been found unexpectedly that the above objects and advantages are accomplished by providing a flexible endless belt track for a track-driven vehicle wherein the belt track has an outer ground-contacting surface to provide traction and an opposite inner surface which is adapted for moving contact with rigid elements of the vehicle drive means and the belt track supporting means. The inner surface includes at least one surface portion of elastomeric material comprised of at least one vulcanized rubbery composition with the rubbery composition comprised of (A) from about 25 to about 100 parts of at least one polybutadiene polymer having a total 1,4 content of from about 80 percent to 100 percent, a cis 1,4 content of at least 10 percent and a combined cis 1,4 plus 1,2 content of at least 30 percent, and (B) from about 0 to about 75 parts of another different rubbery polymer with the parts being by weight per 100 parts of (A) plus (B). The surface portion is adapted to come into direct moving contact with the rigid elements of the vehicle drive means and the belt track supporting means.

The inner surface of the belt track may be generally planar and the surface portion may include at least substantially the entire inner surface of the belt track. In addition, the inner surface of the belt track may comprise a plurality of driving lugs formed as an integral part of the inner surface. The surface portion may also include both the driving lugs and at least substantially the entire inner surface of the belt track. Alternatively the surface portion may also comprise at least one strip extending longitudinally of the inner surface of the belt track.

Preferably the rubbery polymer is comprised of from about 45 to about 65 parts of a vulcanized rubbery polymer of the polybutadiene material as defined above and from about 35 to about 55 parts of a different rubbery polymer. Also preferably the cis 1,4 content of the polybutadiene is at least 30 percent and the combined cis 1,4 content and 1,2 content is at least 50 percent. Even more preferably, the cis 1,4 content is at least 85 percent.

The different rubbery polymer may be at least one rubbery polymer selected from the group consisting of a copolymer of butadiene and styrene, a copolymer of butadiene and acrylonitrile and an ethylene propylene terpolymer. Preferably the different rubbery polymer is a copolymer of butadiene and styrene or a copolymer of butadiene and acrylonitrile with the copolymer of butadiene and styrene being most preferred.

In accordance with the present invention, it has also been found that the above objects and advantages are accomplished by providing a method for making the belt track as described above comprising (A) combining (1) from about 25 to about 100 parts of at least one polybutadiene polymer having a total 1,4 content of from about 80 percent to 100 percent, a cis 1,4 content of at least 10 percent and a combined cis 1,4 plus 1,2 content of at least 30 percent and (2) from about 0 to about 75 parts of another different rubbery polymer to provide a rubbery vulcanizable composition, said parts being by weight per 100 parts of (1) plus (2); (B) forming said rubber composition into at least one surface portion of the inner surface of an unvulcanized belt; and (C) vulcanizing said endless belt to form a belt track for a track-driven vehicle.

It is to be understood that for the purposes of this invention, the term "vulcanize" is used in its broadest sense to include all means of cross-linking rubbery polymers both with and without the use of sulphur.

DESCRIPTION OF THE PREFERRED EMBODIMENTS

Figure 1:
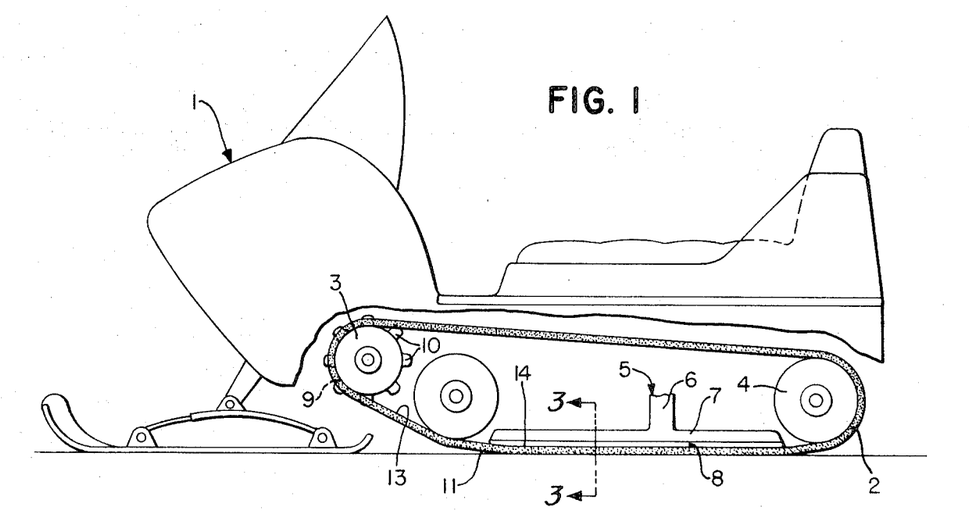
FIG. 1 is a side elevational view of a track-driven vehicle having a slider bar suspension system, parts being broken away to more clearly show the belt track of the present invention.

In FIG. 1, a portion of a snowmobile track-driven vehicle or sled is shown represented generally by the numeral 1. It is to be understood that only that portion of the vehicle is shown which is necessary to adequately illustrate the invention. The vehicle 1 includes a belt track 2 which is trained around longitudinally spaced wheels. One wheel located in the front portion of the vehicle 1 is a sprocket wheel 3 which transmits power from an engine (not shown) to drive the belt track 2. The second wheel 4 near the rear of the vehicle 1 is for the purpose of supporting the belt tread or track 2 during the operation of the vehicle 1. The vehicle 1 in this instance includes a slider type suspension system represented generally at 5 including a metal frame 6 which supports a slider means in the form of a steel rail 7 to which a flat metal slider member 8 is suitably attached.

Figure 2:
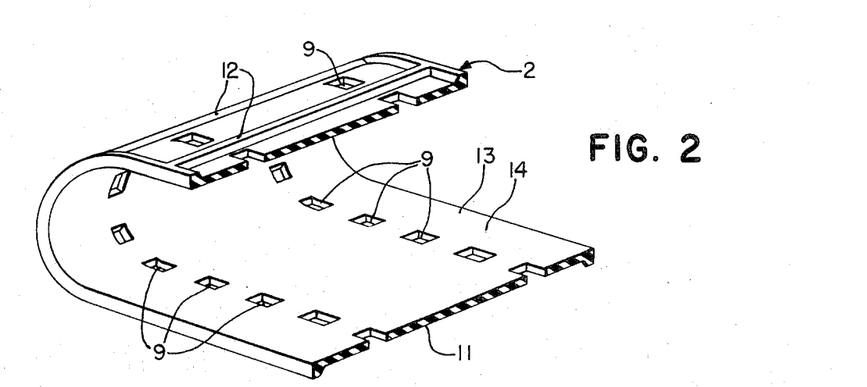
FIG. 2 is a fragmentary perspective view showing the belt track of FIG. 1 in an uninstalled condition.
Figure 3:
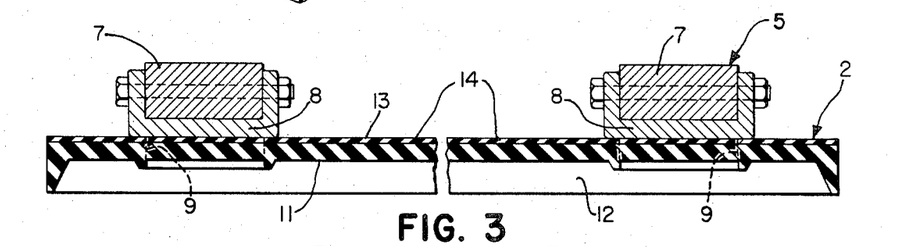
FIG. 3 is an enlarged section taken along line 3—3 of FIG. 1.

As is best shown in FIGS. 2 and 3, the belt track 2 includes two spaced rows of sprocket teeth-receiving openings 9 disposed along the lateral edges of the belt track to accommodate the sprocket teeth 10 of the sprocket wheel 3. The belt track 2 includes an outer, ground-engaging cover or surface 11 to provide traction for the vehicle as it travels over ice or snow. The ground-engaging cover 11 includes traction means 12 extending generally transversely of the belt track 2 and as is well known in the art, the traction means may, for example, be cleats or corrugations of elastomeric material reinforced by metal or fiber glass rods embedded in the elastomeric material or to be exposed metal grouser bars attached to the ground-contacting surface of the belt. The belt track 2 further includes an inner surface or vehicle-engaging cover 13 disposed on the opposite side of the belt track from the ground-contacting surface 11 which comes into moving contact with rigid elements of the vehicle drive system or the belt track supporting system during the operation of the vehicle 1. The belt track 2 is normally comprised of a high quality natural or synthetic rubber reinforced in the longitudinal direction by textile fabric material either of a cord or woven construction. The textile fabric material, for example, may be cotton, nylon, rayon, polyester or even metal or glass fibers.

As most clearly illustrated in FIG. 3, the inner surface 13 of the belt track 2 includes at least one generally planar surface layer or portion 14 comprised of an improved flexible, low friction and highly wear-resistant elastomeric material which will be hereinafter described. The surface portion 14 bears against the rigid slider members 8 during the operation of the vehicle 1 and thereby comes into direcct frictional sliding engagement therewith when the belt track 2 travels around the sprocket wheel 2 and belt supporting wheel 4. Preferably, the surface portion 14 includes at least substantially the entire inner surface 13 of the belt track 2 and is integrally formed therewith during the vulcanization of the track to provide an improved flexible, low portion and highly wear-resistant surface for contact with rigid elements of the vehicle drive and suspension systems.

In the embodiment of the invention illustrated in FIG. 3, the slider members 8 of the slider suspension system 5 are disposed closely adjacent to the longitudinal edges of the belt track 2. It should be appreciated, however, that these members 8 may also be placed in other locations across the width of the vehicle suspension system and would therefore slide against the surface portions in other locations as well. In addition, only a single slider element may be provided if desired for example contacting the surface portion of the inner surface of the belt at its approximate center position.

Figures 4, 5, 7:
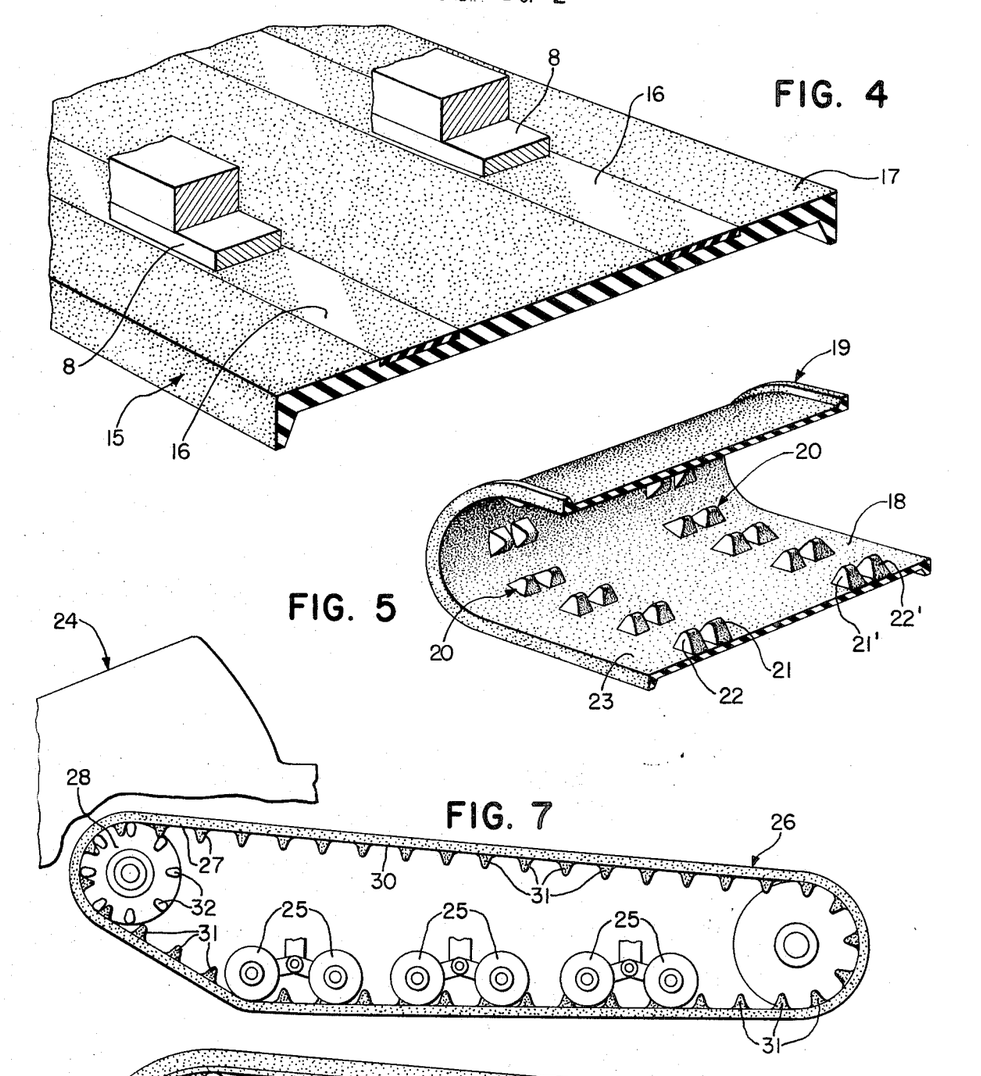
FIG. 4 is a fragmentary perspective view illustrating another form of the invention shown in FIGS. 1-3.
FIG. 5 is a modification of the invention shown in FIG. 2 illustrating a preferred embodiment of the belt track of the present invention.
FIG. 7 is a side elevational view of another track-driven vehicle having a bogie-type suspension system and including a belt track similar to that shown in FIGS. 5 and 6.

Alternately, the surface portion may be one or more strips of elastomeric material extending generally longitudinally of the belt track. For example, FIG. 4 shows another form of the invention in which the belt track 15 includes a surface portion comprised of a pair of spaced strips 16 disposed in alignment with the slider members 8 so that a direct sliding frictional contact is made between the strips and the slider members during the operation of the belt track 1. The strips 16 are preferably bonded integrally with the inner surface 17 of the belt track 15 during vulcanization.

Figure 6:
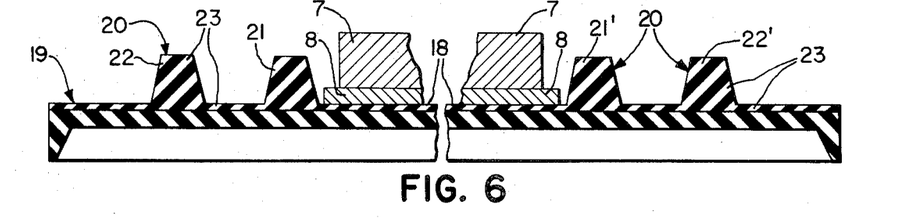
FIG. 6 is a modification of the invention shown in FIG. 3 illustrating the belt track of FIG. 5 in an installed condition.

In the modifications of the invention shown in FIGS. 5 and 6, the inner surface 18 of the belt track 19 includes a plurality of driving teeth or lugs 20 which are preferably molded on the inner surface during vulcanization. As illustrated, two parallel rows of lugs 20 are provided along each of the longitudinal extending edges of the belt track 19 and the slider members 8 are positioned adjacent to the inner most rows of lugs 21 and 21'. Of course, the slider members 8 may also be disposed adjacent to each of the outermost rows of lugs 22 and 22' or even between each parallel row 21, 21' or 22, 22' or in any position between the two sets of parallel rows depending upon the particular type of suspension system used. In this way, the belt track may be used with a variety of different type slider suspension systems with the exact location of the slider members being immaterial. Preferably, the surface portion 23 includes not only the driving lugs 20 but the entire inner surface 18 of the belt 19.

Figure 8:
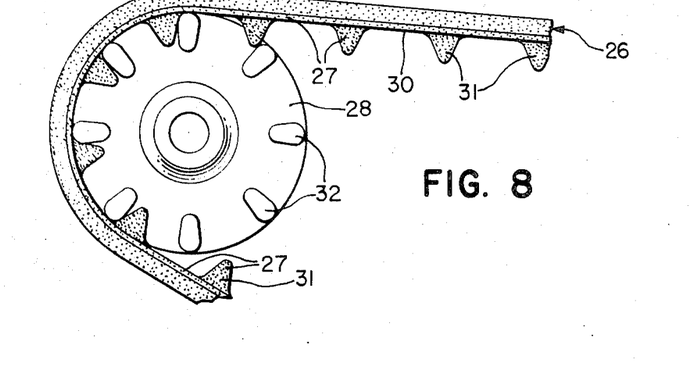
FIG. 8 is a fragmentary side elevational view of a portion of the invention shown in FIG. 7.

Those skilled in the art are aware that many combinations of driving and suspension arrangements are possible in small tracked vehicles of the type described in which rigid elements of the systems are in direct sliding frictional contact or engagement with the inner surface of the belt track. For example, in the vehicle 24 shown in FIG. 7, rather than a slider type suspension system, a series of wheels or bogies 25 are used which are disposed along the inside of the portion of the belt track 26 which is in contact with the ground. In this case, the belt track 26 having improved surface portions 27 (See FIG. 8) is trained around at least one pair of spaced wheels, one of which is a sprocket driving wheel 28 and the other of which is a supporting idler wheel 29. The bogies 25 are in moving contact with the inner surface 30 of the belt track as it travels around the wheels 28 and 29. The sprocket wheel 28 is adapted to operate with driving teeth or lugs 29 of the type shown in FIGS. 5 and 6 which have been integrally formed on the inner surface 30 of the belt track 26. When the sprocket teeth 31 of the sprocket wheel 28 contact the lugs 29 as shown in FIG. 8, a direct sliding frictional engagement results between the sprocket teeth and the lugs.

It should also be apparent to those skilled in the art that the belt track of the present invention can be of the type having at least one row of sprocket teeth-receiving openings extending completely through the belt as shown in FIGS. 1–3 or of the type including a plurality of driving teeth or lugs formed on the inner surface without having sprocket teeth-receiving openings provided therein as shown in FIGS. 5 and 6 or may be a combination of these two constructions having both sprocket teeth-receiving openings and driving lugs.

The surface portions are formed of at least one vulcanized rubbery composition comprised of at least one polybutadiene polymer and another different rubbery polymer which is preferably either a copolymer of butadiene and styrene, a copolymer of butadiene and acrylonitrile or an ethylene propylene terpolymer. In this composition the polybutadiene polymer is preferably combined with a copolymer of butadiene and styrene or a copolymer of butadiene and acrylonitrile with the copolymer of butadiene and styrene providing the most satisfactory results.

The polybutadiene polymer is present in an amount of from about 25 to about 100 parts and the other different rubbery polymer is present in an amount of from about 0 to about 75 parts with the parts being by weight per 100 parts of the total combined polymers. In the most preferred form of the invention, the polybutadiene polymer is present in an amount of from about 45 to about 65 parts and the different rubbery polymer in an amount of from about 35 to about 55 parts based on 100 parts of the polybutadiene polymer plus the different rubbery polymer.

The polybutadienes suitable for use in this invention are those which contain a total 1,4 content of from about 80 percent to 100 percent, a cis 1,4 content of at least 10 percent and a combined cis 1,4 plus 1,2 content of at least 30 percent. Preferably the polybutadiene polymer has a cis 1,4 content of at least 30 percent and a cis 1,4 content plus 1,2 content of at least 50 percent. Most preferably the polybutadiene polymer has a cis 1,4 content of at least 85 percent.

Representative of these polybutadienes are those which are characterized by having at least 85 percent of polybutadiene units in a cis and trans 1,4 structure of which about 20–60 percent are cis and not more than 15 percent in the 1,2 configuration. Such polymers are prepared by polymerizing butadiene in the presence of metallic lithium, hydrocarbon lithium compounds or other lithium based catalyst systems.

Other types of polybutadienes suitable for use in this invention are those described in US Pat. No. 3,178,402. These polybutadienes have a cis 1,4 content above 90 percent. They are made by polymerizing butadiene in the presence of a catalyst system comprising a trialkyl aluminum and titanium tetraiodide.

US Pat. No. 3,281,404. The process described in this patent produced a polybutadiene having a cis 1,4 content in excess of 90 percent and the catalyst employed is a metal salt of Group VIII of the periodic table such as cobaltous chloride and an organometallic compound such as diethylaluminum.

Still another suitable polybutadiene is disclosed in US Pat. No. 3,170,907. The polybutadienes prepared in accordance with the teachings of this patent have a cis 1,4 content in excess of 90 percent and are prepared by contacting polybutadiene while in an inert solvent such as benzene with a catalyst consisting of a nickel salt of an organic acid, a boron trifluoride etherate and an organometallic compound of aluminum.

Still another suitable polybutadiene is an emulsion polymerized polybutadiene which is prepared from butadiene which had emulsified by means of a soap or a synthetic emulsifier with a water base and a catalyst is employed which provides a three radical such as peroxy or hydroxy or a redox catalyst system. These polybutadienes consist of a cis 1,4 content of about 10 percent, a trans 1,4 content of about 70 percent and a 1,2 content of about 20 percent.

The copolymers of butadiene and styrene used in the practice of the present invention are the butadiene 1,3/styrene elastomers (SBR) well known in the art. These polymers normally possess a bound butadiene content of at least 40 weight percent and preferably at least 50 weight percent, most preferably 70 weight percent.

The copolymers of butadiene and acrylonitrile commonly referred to as nitrile rubber used in the practice of the present invention are a vulcanized rubbery copolymer of butadiene and acrylonitrile of the type disclosed in Rubber Chemistry and Technology "A rubber review for 1963 nitrile rubber by W. Hofmann," Volume 37 April–June 1964, Part 2. In the nitrile rubbers used in the present invention preferably the acrylonitrile is present in an amount of at least 25 percent of the total copolymer with the amount of acrylonitrile and the copolymers of the present invention being normally from 25 percent to about 60 percent.

The ethylene propylene terpolymers which may be used in accordance with the present invention are terpolymers of ethylene, propylene and non-conjugated dienes (EPDM). Representative examples of these rubbery terpolymers are described in US Pat. No. 3,331,793, Column 2, lines 54–59.

The rubbery composition of the present invention can be prepared and compounded using any of the conventional compounding techniques as well as any of the known compounding ingredients such as carbon black, silica, zinc oxide, stearic acid and sulphur.

The method of making the flexible endless belt track of the present invention includes the steps of combining at least one polybutadiene rubber of the type described above with another different rubbery polymer such as a styrene/butadiene rubber or a nitrile rubber in the preferred proportions as discussed above to provide a rubbery valcanizable composition This can be accomplished by conventional mixing techniques using conventional rubber processing equipment such as a Banbury mixer or mixing mill. The rubbery vulcanizable composition is then formed into at least one surface portion of the inner surface of the unvulcanized belt. This may be accomplished also in a conventional manner by assembling the various components of the belt track on a building drum or mandrel with the surface portion or layer being disposed in the desired location on the inner surface of the track. The various belting components are then combined into an integral composite structure by means of conventional vulcanizing equipment. For instance, a circular mold having the desired outer or ground-contacting surface configuration in which an inside diaphragm exerts pressure to force the unvulcanized belt into the mold will produce an endless belt track. An autoclave arrangement may also be employed to achieve a satisfactory product. Alternately, the belt tracks may be cured in a flat press and made endless by conventional splicing techniques.

The driving teeth or lugs, if desired, may be formed on the inner surface of the belt track by using a mold having the desired contour. In most instances, not only the lugs themselves but the entire inner surface of the belt track will be formed from the rubbery composition as described previously.

The belt tracks after vulcanization are of improved construction with the surface portions of the inner surface of the track having a relatively low coefficient of friction, a relatively high abrasion resistance and are flexible under conditions of extremely high and low temperatures.

The following examples further illustrate the objects and advantages of this invention.

EXAMPLE 1

Several sample belt tracks of the type shown in FIG. 5 were manufactured having inner surfaces 18 in which the entire inner layer included the surface portions 23 of the present invention. Representative of these samples was a belt track in which the surface portion was comprised of a vulcanized rubbery composition of a polybutadiene rubber and a styrene/butadiene rubber having the following formulation identified as Composition A. Also representative was another belt track in which the surface portion was comprised of a vulcanized rubbery composition of a butadiene rubber and a nitrile rubber having the following formulation identified as Composition B.

|  | Parts by Weight A | B |
|---|---|---|
| Polybutadiene (1) | 45.00 | 50.00 |
| Styrene/Butadiene Rubber (2) | 55.00 | — |
| Nitrile Rubber (3) | — | 50.00 |
| Non-Black Filler | — | 50.00 |
| Carbon Black | 88.60 | 25.00 |
| Stearic Acid | 1.00 | 1.10 |
| Antioxidant | 2.70 | 1.65 |
| Antiozonant | 3.00 | 3.00 |
| Plasticizers | 13.50 | 35.00 |
| Zinc Oxide | 5.00 | 5.50 |
| Vulcanizing Agents | 8.50 | 4.61 |

1. Solution polymerized cis 1,4 polybutadiene polymer using a stereo specific catalyst and having a cis 1,4 content of at least 85%.
2. A rubbery copolymer of butadiene and styrene (SBR-1500).
3. A rubbery copolymer of butadiene and acrylonitrile.

In Composition A the plasticizers used were aromatic processing oil and a hydrocarbon tackifying resin and the carbon black used was of the high abrasion furnace type. The vulcanizing agents used were of the sulphur type. The styrene/butadiene rubber was added to the formulation as part of a rubber and oil masterbatch also including a high abrasion furnace black, an aromatic processing oil and an antioxidant stabilizer.

In Composition B the plasticizers used were a phenolic thermosetting resin and a coumarone indene resin. The carbon black used was of the fast extruding furnace type and the non-black filler was a hydrated silica. The vulcanizing agents used were of the sulphur type.

Other formulations similar to Compositions A and B were used, including various amounts of both carbon black and non-black fillers, such as silica. In addition, cure systems of the peroxide type were also used.

The above formulations are expressed in proportions on the basis of parts by weight based on the weight of the polybutadiene and styrene/butadiene rubbers in Composition A and the polybutadiene and nitrile rubbers in Composition B.

The above compositions were prepared in the following manner. The polybutadiene polymer and the different rubbery polymers of either styrene/butadiene or nitrile rubber were added together with about 10 to 20 parts of the carbon black or non-black filler to a Banbury mixer and mixed to produce a non-productive stock. All of the other compounding ingredients except the vulcanizing agents were then added to the non-productive stock in the Banbury during a second pass mixing procedure. The vulcanizing agents were then added to the non-productive stock after the second pass mixing procedure on a rubber mixing mill to form an unvulcanized rubbery composition in accordance with the present invention.

After the mixing procedure was complete, samples were taken from the compositions and tested for friction and wear-resistance properties.

The wear resistance and coefficient of friction of each composition was determined by first forming a 1 cubic inch sample into the shape of a torus or doughnut having an inside diameter of 0.880 of an inch and an outside diameter of 1.100 inch and a thickness of about ½ inch. This was accomplished by curing the sample in a suitable mold cavity for a period of 20 minutes at a temperature of 320° F. Each sample was then weighed on an analytical balance with its weight being measured in grams. After vulcanization, the sample in the form of a toroidal shaped molded rubber button was placed with one of its flat sides against a steel plate having a flat, smooth surface. A constant force of 5 pounds was exerted on the sample in a direction normal to the steel surface. The sample was then rotated at a speed of 2400 rpm for a period of 30 minutes. Each sample was again weighed at the end of the test procedure with its weight being recorded in grams. The difference between the weight of the sample after the test was conducted and the weight of the sample before the test was conducted gave an indication of the wear rate of the rubbery composition of the surface portions.

The torque required to rotate the sample in the specified 2400 rpm under a 5 pound normal load was measured at regular intervals of time throughout the test procedure. Temperature readings at the surface of the steel plate were also measured at the same intervals of time. The coefficient of friction ($\mu$) of the sample was calculated using the torque values and the normal force of 5 pounds.

The results of the friction and wear tests are shown below in Tables I and II respectively. A sample of a high density polyethylene resin conventionally used as a low friction material in the construction of slider bars in vehicle suspension systems for track-driven vehicles was also produced and tested in a similar manner to the samples of Compositions A and B and is identified as Composition C. The polyethylene resin was "1900 HMW Polymer" manufactured by Hercules, Inc.

The above data indicates that the compositions forming the surface portions of the present invention have acceptable friction and wear properties which compare favorably to conventional low friction materials such as polyethylene. For optimum results it was determined that the initial or starting coefficient of friction ($\mu$) should be no greater than 2.000 and that the weight loss of each sample should be no greater than 0.1000 of a gram. For some formulations the initial coefficient of friction values were high but upon retesting, it was found that the surface portion becomes polished resulting in a lessening of the frictional forces.

It should be noted that the 1900 HMW Polymer, after only 13 minutes of testing, reached a temperature of 198° F and began to show considerable wear. Consequently, it was not possible to run the friction and wear tests beyond 15 minutes. This data indicates that the formulations of the present invention have superior resistance to wear at high temperatures than the conventional polyethylene material.

The above compositions were then processed on a conventional calender with the surface portions to be used for the inner surface of the belt track being calendered to a thickness of about 0.040 of an inch onto one face of a web of square-woven nylon fabric having a width of about 48 inches and the surface portions to be used for the driving lugs being calendered to the desired thickness to provide a sufficient volume of rubber to form the driving lugs. The rubber-coated fabric material was then applied to form the surface portion or layer 23 of the inner surface 18 of a belt track 19 of the type shown in FIGS. 5 and 6 and strips of rubber were applied to form the driving lugs 20 of the belt track 19.

Each belt track was manufactured on a building mandrel by the following method. First layers or plies of relatively soft and then relatively hard polyisoprene synthetic rubber were wrapped around the mandrel to a thickness of about 0.070 of an inch to form the ground-contacting cover or tread portion of the belt track. Fiber glass rods were next disposed transversey of the belt to provide the vulcanized track with the necessary transverse rigidity. Plies of nylon fabric and longitudinally extending fiber glass cords were next applied to provide the vulcanized track with longitudinal strength and stability. The nylon fabric with the rubbery composition of this invention coated on one side thereof were applied so that the coated layer of elastomeric material faced outwardly of the assembled belt components. The elastomeric material intended to form the molded driving lugs were applied last. The assembly was cut into belt sizes having a width of about 15½ inches.

The belt track assembly was vulcanized in a circular mold having an appropriate mold contour to form a tread pattern on the ground-contacting surface of the belt and parallel rows of driving teeth or lugs on the inner surface of the belt as shown in FIG. 5. The molding apparatus included an inside diaphragm to force the unvulcanized belt against the surfaces of the mold. Each belt track was vulcanized for a period of 25 minutes at a temperature of 320° F. The finished belt track had a length of about 131 inches, a width of about 15½ inches and a carcass thickness of about 0.250 of an inch with a lug height of about ⅝ of an inch and a tread height of about ⅝ of an inch. The surface portion which

TABLE I
FRICTION TEST
COMPOSITION

| A | | | B | | | C | | |
|---|---|---|---|---|---|---|---|---|
| Time (Mins) | Coeff of Friction ($\mu$) | Temp °F | Time (Mins) | Coeff of Friction ($\mu$) | Temp °F | Time (Mins) | Coeff of Friction ($\mu$) | Temp °F |
| 0 | 1.065 | 69 | 0 | 0.253 | 71 | 0 | 0.179 | 72 |
| 1 | 0.887 | 81 | 1 | 0.388 | 83 | 1 | 0.197 | 85 |
| 2 | 0.505 | 92 | 2 | 0.409 | 99 | 2 | 0.224 | 90 |
| 5 | 0.388 | 117 | 5 | 0.369 | 138 | 5 | 0.291 | 112 |
| 10 | 0.272 | 180 | 10 | 0.369 | 194 | 10 | 0.472 | 158 |
| 20 | 0.117 | 196 | 20 | 0.330 | 260 | 13 | 0.810 | 198 |
| 30 | 0.078 | 190 | 30 | 0.253 | 289 | 15 | 0.472 | 212 |

TABLE II
WEAR TEST

| | Compositions | | |
|---|---|---|---|
| | A | B | C |
| Weight Loss (Grams) | 0.0074 | 0.0079 | 0.0248 | included substantially the entire inner surface of the belt track had a thickness of about 0.040 of an inch.

An additional friction test was performed on the vulcanized belt tracks in order to simulate actual field conditions. This test involved mounting the vulcanized belt tracks on a motor-driven apparatus having sprocket wheels and belt-supporting wheels and including an inverted slider suspension system with a 1 inch wide steel slide. During the operation of the belt track the steel slide was in moving contact or engagement with the surface portions of the belt track. The temperature of the slide and the torque input from the motor were recorded during the tests. The test results were substantially the same as shown in Table I, thereby indicating that the preliminary friction tests had been accurate.

After the tracks were vulcanized, the cold temperature flexibility of each composition was tested in the following manner. Three samples 8 in. × 1 in. × 0.250 of an inch were cut from each vulcanized belt track. These samples were placed in a cold chamber maintained at a temperature of −65° ± 2° F for a period of 5 hours. The samples were then removed from the cold chamber and were bent or flexed around a 2 inch diameter mandrel to a 180° bend in order to determine if any cracks developed. Both the belt track which included an inner surface formed of Composition A and the belt track which included an inner surface formed of Composition B showed no cracking after being tested in the manner described above. The results indicate that both Composition A and B had acceptable cold temperature flexing properties.

This example can be repeated by using a polybutadiene polymer of the type defined and in the given amounts as taught in the present inventin in combination with an ethylene propylene terpolymer with the results being substantially the same. Of course, appropriate compounding changes well known in the art may be necessitated by the use of ethylene propylene terpolymer in place of either styrene/butadiene or nitrile rubber.

EXAMPLE 2

A belt track of the type shown in FIG. 5 was manufactured having its entire inner surface comprised of Composition A of Example 1. The track included inside driving lugs and was reinforced by fiber glass rods extending transversely of the belt. The belt track was mounted on a Massey Ferguson Ski Whiz Model 500 snowmobile having a slider suspension system similar to the vehicle shown in FIG. 1. This tracked vehicle is identified as Sled A. The coasting or drag characteristics of Sled A was compared to that of sleds of other constructions identified as Sleds B, C, D and E.

Sled B was also a Massey Ferguson Ski Whiz Model 500 snowmobile with a bogie type suspension system similar to the vehicle shown in FIG. 7. Sled B was equipped with a belt track of the type disclosed in Kell US Pat. No. 3,480,339 having a pair of sprocket teeth-receiving openings disposed longitudinally of the belt and transversely reinforced by a pair of spaced layers of polyester cable cords. Sled C was the same type and model snowmobile as Sled B with a bogie type suspension. The belt track used on Sled C had the same reinforcement as the belt track of Sled B but had a plurality of driving teeth or lugs molded on its inner surface. Sled D was of the same type and model as Sled C also having a bogie type suspension system except that the belt track was reinforced with transverse steel bars molded into the elastomeric material of the belt. Sled E was an Artic Enterprises Puma snowmobile of the type disclosed in US Pat. No. 3,485,312 having a slider type suspension system using a slider bar composed of polyethylene (1900 HMW polymer) and a belt track including a plurality of transverse riveted on steel grouser bars.

During the tests, Sled A was in operation for nearly 13 hours being compared in turn with each of Sleds B, C, D and E. In the testing procedure, the sleds were operated side-by-side over a predetermined course at a speed of approximately 35 mph. Each sled was allowed to coast with the distance at which one sled would coast past the other being measured.

The tests indicated that Sled A was the equivalent of Sleds B and C and compared generally favorably to Sleds D and E although Sled A did not exhibit equal drag characteristics to those of the latter named sleds.

EXAMPLE 3

A belt track was produced having an inner surface comprised of Composition A of Example 1. This track was of the same construction as the tracks described in Example 2 and included driving lugs on its inner surface. This track was compared in a series of tests with a belt track of a polyurethane composition reinforced with square-woven polyester textile fabric material. The belt track of the present invention was installed in a Massey Ferguson Ski Whiz Model 500 snowmobile having a slider bar suspension system with a steel slider. This track is identified as Belt Track A. The belt track of polyurethane textile fabric construction was installed in an identical snowmobile vehicle having an identical suspension system and is identified as Belt Track B.

The tracks, when in a lubricated condition, were tested in side-by-side comparative tests to determine their performance characteristics which are summarized below in Table III.

TABLE III

| Tests | Belt Track A | Belt Track B |
| --- | --- | --- |
| Wear Surface | No noticeable wear | Wear is evident in 10-20 hours |
| Driving Lugs | Some chipping of lugs with slider suspension. Lost 2 lugs on 1 track. | Very little wear |
| Side Hill Stability | Fair | Fair |
| Acceleration | Fair to Good | Poor to Fair |
| Cornering | Fair | Fair |
| Hill Climbing | Fair to Good | Poor to Fair |
| Top Speed | Good | Good |
| Coasting | Fair to Good | Good |

The test results indicate that Belt Track A including the improved inner wear surface of the present invention compared very favorably to Belt Track B of a conventional polyurethane textile fabric construction and was superior in wear resistance, acceleration and hill climbing.

It should be apparent to those skilled in the art that the present invention provides a belt track for a track-driven vehicle and a method of making such a belt track wherein the belt track has an improved flexible low friction and wear resistant inner surface capable of withstanding direct sliding frictional contact with elements of the vehicle driving system and the track suspension system.

While certain representative embodiments and details have been shown for the purpose of illustrating the invention, it will be apparent to those skilled in the art that varios changes and modifications may be made therein without departing from the spirit or scope of the invention.

We claim:

1. A flexible endless belt track for a track driven vehicle, said belt track having an outer ground-contacting surface to provide traction and an opposite inner surface which is adapted for moving contact with rigid elements of the vehicle drive means and the belt track sppporting means, said inner surface including at least one surface portion of elastomeric material comprised of at least one vulcanized rubbery composition, said rubbery composition comprised of (A) from about 25 to about 100 parts of at least one polybutadiene polymer having a total 1,4 content of from about 80 percent to 100 percent, a cis 1,4 content of at least 10 percent and a combined cis 1,4 plus 1,2 content of at least 30 percent and (B) from about 0 to about 75 parts of another different rubbery polymer, said parts being by weight per 100 parts of (A) plus (B), said surface portion being adapted to come into direct moving contact with said rigid elements.

2. The belt track as claimed in claim 1 wherein said inner surface is generally planar and said surface portion includes at least substantially the entire inner surface of said belt track.

3. The belt track as claimed in claim 1 wherein said surface portion comprises at least one strip extending longitudinally of said inner surface.

4. The belt track as claimed in claim 1 wherein said vulcanized rubbery composition is comprised of from about 45 to about 65 parts of said polybutadiene polymer and from about 35 to about 55 parts of said different rubbery polymer, said parts being by weight per 100 parts of (A) plus (B).

5. The method of making the flexible endless belt track of claim 1 comprising (A) combining (1) from about 25 to about 100 parts of at least one polybutadiene polymer having a total 1,4 content of from about 80 percent to 100 percent, a cis 1,4 content of at least 10 percent and a combined cis 1,4 plus 1,2 content of at least 30 percent and (2) from about 0 to about 75 parts of another different rubbery polymer to provide a rubbery vulcanizable composition, said parts being by weight per 100 parts of (1) plus (2); (B) forming said composition into at least one said surface portion of the inner surface of an unvulcanized belt, and (C) vulcanizing said endless belt to form a belt track for a track-driven vehicle.

6. The belt track as claimed in claim 1 wherein said surface portion comprises a plurality of driving lugs formed as an integral part of said inner surface.

7. The belt track as claimed in claim 6 wherein said surface portion comprises both said driving lugs and at least substantially the entire inner surface of said belt track.

8. The belt track as claimed in claim 1 wherein the cis 1,4 content of said polybutadiene is at least 30 percent and the combined cis 1,4 plus 1,2 content is at least 50 percent.

9. The belt track as claimed in claim 8 wherein said cis 1,4 content is at least 85 percent.

10. The belt track as claimed in claim 1 wherein said different rubbery polymer is at least one rubbery polymer selected from the group consisting of a copolymer of butadiene and styrene, a copolymer of butadiene and acrylonitrile and an ethylene propylene terpolymer.

11. The belt as claimed in claim 10 wherein said different rubbery polymer is a copolymer of butadiene and styrene.

12. The belt track as claimed in claim 10 wherein said different rubbery polymer is a copolymer of butadiene and acrylonitrile.

13. In an endless belt track for a snow traveling vehicle or the like, said belt having a ground-engaging cover including traction means to provide traction in the snow and an opposite vehicle-engaging cover which is in direct sliding frictional contact with rigid elements of the vehicle drive system and belt track supporting system, the improvement wherein said vehicle-engaging cover includes at least one flexible, low friction, abrasion-resistant surface layer of elastomeric material comprised of at least one vulcanized rubbery composition, said rubbery composition comprised of (A) from about 25 to about 100 parts of at least one polybutadiene polymer having a total 1,4 content of from about 80 percent to 100 percent, a cis 1,4 content of at least 10 percent and a combined cis 1,4 and 1,2 content of at least 30 percent and (B) from about 0 to about 75 parts of another different rubbery polymer, said parts being by weight per 100 parts of (A) plus (B), said surface layer being adapted to come into direct sliding frictional contact with said rigid elements.

14. In a track driven vehicle comprising the combination of vehicle driving means, belt track supporting means and a flexible endless belt track having an outer ground-contacting surface and an opposite inner surface, the driving and track supporting means engaging the inner surface of the belt, the improvement wherein said inner surface includes at least one surface portion of elastomeric material contacting at least one of said means, said surface portion comprised of at least one vulcanized rubbery composition, said rubbery composition comprised of (A) from about 25 to about 100 parts of at least one polybutadiene polymer having a total 1,4 content of from about 80 percent to 100 percent, a cis 1,4 content of at least 10 percent and a combined cis 1,4 plus 1,2 content of at least 30 percent and (B) from about 0 to about 75 parts of another different rubbery polymer, said parts being by weight per 100 parts of (A) plus (B), said surface portion being adapted to come into direct contact with rigid elements of at least one of said means.

15. The improvement as claimed in claim 14 incorporated in a track-driven vehicle wherein said driving means comprises spaced wheels, at least one of which being a sprocket wheel, around which the belt is trained, said supporting means is a plurality of bogies disposed along the length of the belt and said surface portion comprises a plurality of driving lugs formed as an integral part of said inner surface and said driving lugs are in direct engagement with said sprocket wheel.

16. The improvement as claimed in claim 14 wherein said surface portion comprises a plurality of driving lugs formed as an integral part of said inner surface and said driving lugs are in direct engagement with said driving means.

17. The improvement as claimed in claim 14 incorporated in a track-driven vehicle wherein said driving means comprises spaced wheels at least one of which is a sprocket wheel around which the belt is trained, said supporting means comprises sliding means extending longitudinally of the vehicle and said inner surface is generally planar with said surface portion including at least substantially the entire inner surface of said belt track so that said surface portion is in direct contact with the sprocket wheel and the sliding means.

18. The improvement as claimed in claim 14 wherein said surface portion comprises both said driving lugs and at least substantially the entire inner surface of said belt track with said driving lugs being in direct engagement with said sprocket wheel and the inner surface in direct engagement with said sliding means.

19. The improvement as claimed in claim 17 wherein said belt track includes at least one row of openings therein and said sprocket wheel includes a plurality of teeth adapted to mesh with the openings.

20. The improvement as claimed in claim 17 wherein said sliding means is one or more elongated metal members and said surface portion comprises one or more strips extending longitudinally of the belt and in substantial alignment with said metal members so that a direct frictional sliding contact is maintained therebetween.

* * * * *

PO-1050 (5/69)

UNITED STATES PATENT OFFICE
CERTIFICATE OF CORRECTION

Patent No. 3,781,067     Dated December 25, 1973

Inventor(s) Merritt E Dodson, Richard L Marsh, Frank C Masters

It is certified that error appears in the above-identified patent and that said Letters Patent are hereby corrected as shown below:

Column 4, line 53, "direcct" should read --direct--;
           line 55, "2" should be changed to --3--.

Column 5, line 28, "21' " should be changed to --22--;
           line 28, "22" should be changed to --21'--;
           line 54, "lugs 29" should be changed to --lugs 31--;
           line 57, "teeth 31" should be changed to --teeth 32--;
           line 58, "lugs 29" should be changed to --lugs 31--.

Column 6, line 50, before "US Pat. No." insert --Still another suitable polybutadiene is described in--.

Column 9, line 33, "in" should read --at--.

Column 11, line 34, "inventin" should read --invention--.

Signed and sealed this 13th day of August 1974.

(SEAL)
Attest:

McCOY M. GIBSON, JR.
Attesting Officer

C. MARSHALL DANN
Commissioner of Patents